Nov. 14, 1944.  E. L. WOOD  2,362,737
BREAD SLICING DEVICE
Filed Feb. 8, 1943
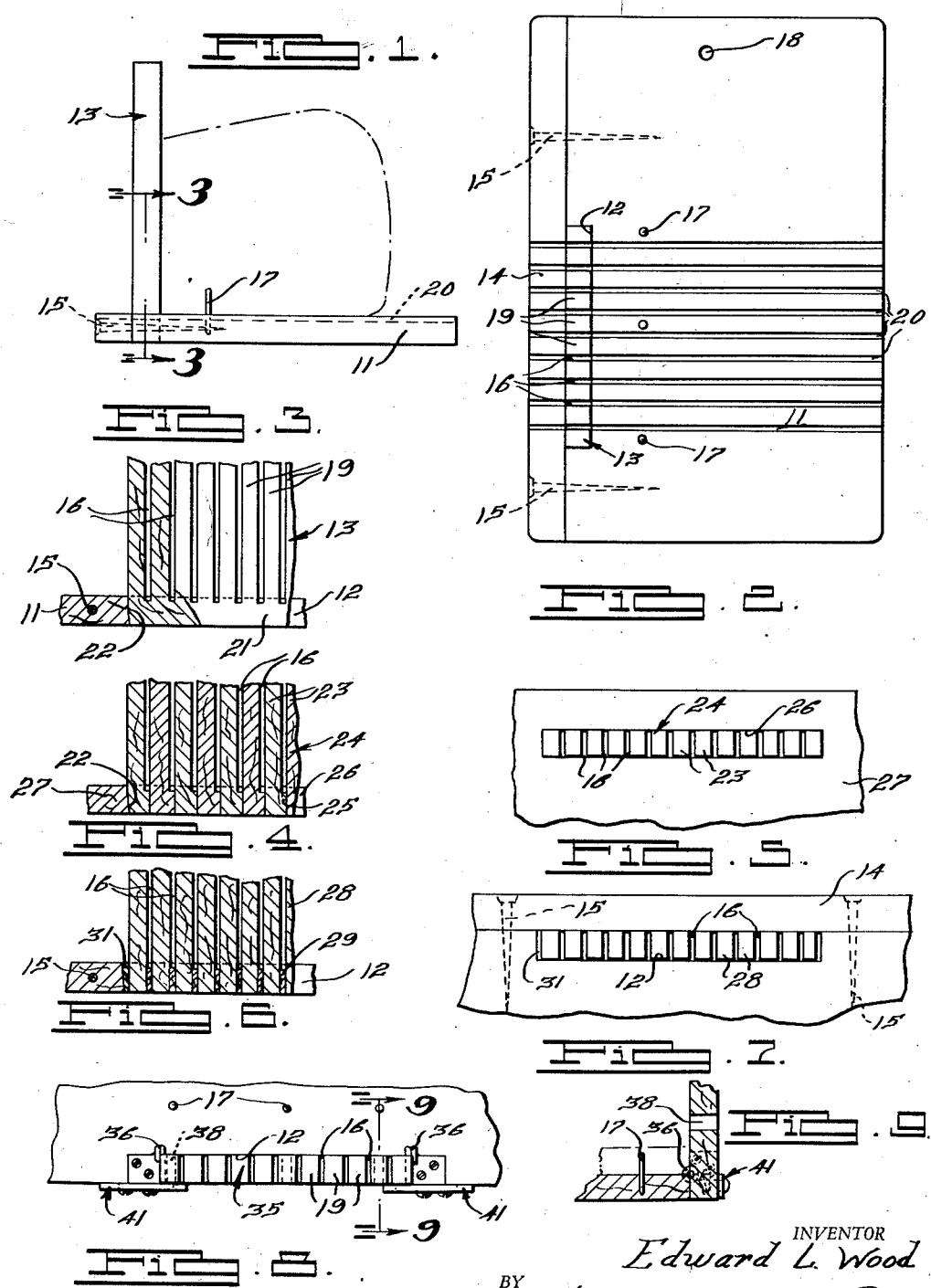
INVENTOR
Edward L. Wood
BY
Harness, Dickey & Pierce
ATTORNEYS Patented Nov. 14, 1944

2,362,737

UNITED STATES PATENT OFFICE 2,362,737

BREAD SLICING DEVICE

Edward L. Wood, Detroit, Mich.

Application February 8, 1943, Serial No. 475,079

4 Claims. (Cl. 146—150)

This invention relates to bread-slicing devices, and particularly to a device for supporting a loaf of bread and guiding a knife for cutting the bread into slices of predetermined thickness.

Miter-boxes and similar cumbersome devices have been suggested as a means for holding and gaging the thickness of the slice of bread to be cut from a loaf. Attachments have also been suggested for bread knives which regulate the thickness of the slice. The present invention pertains to a simplified structure for accurately cutting a plurality of slices from a loaf of bread which are of like predetermined thickness.

The device embodies a base from which an upright element extends having a plurality of slots therein equally spaced and of a thickness to receive the knife blade and of a length to guide the knife during the cutting operation. A plurality of pins extend upwardly from the base for retaining the loaf of bread in position as it is supported with the bottom of the loaf against the upright element by one hand of the operator as the other hand draws the knife through the bread and slot to cut a slice therefrom. It is only necessary to move the knife from one slot to another to cut a plurality of like slices from the loaf.

It has been found that, by placing the bottom of the loaf against the upright element, more accurate location of the loaf is obtained, which prevents waste at its ends, particularly at its forward end, when the loaf has been repositioned on the pins. In the form herein illustrated, the base is made of wood, having an elongated notch in one edge in which the upright element is disposed and secured in position by a strip of wood which is screwed to the edge of the base for clamping the upright element in vertical position. When the upright element is made from a single piece of material, it has a plurality of slots cut therein, equally spaced the thickness of the slice to be cut and of a width to receive the blade of the bread knife employed for slicing the bread.

It is within the purview of this invention to construct the upright element from a plurality of strips which are spaced apart and which may be wedged into a rectangular opening in the base or which may be wedged in an opening and clamped to the base element by the edge strip.

A further form which the invention may assume is that in which the upright element is disposed in an elongated notch to which the element is hinged in such manner as to be folded forwardly onto the upper face of the base. Slots in the element receive the locating pins and prevent the pins from being damaged when the device is compactly folded for storage.

Accordingly, the main objects of this invention are: to provide a device for gaging the slicing of bread which embodies a base having an upright element with spaced fingers the thickness of a slice to be cut for guiding the blade of the knife therebetween; to form a bread-holding and knife-guiding device from a base having an upright element secured thereto in a notch by a strip which is drawn against one edge of the base; to form a bread-slicing device from a base having an upright element formed thereon from a plurality of separate fingers which are spaced apart to guide the knife as it slices the bread which is retained in position by a plurality of pins aligned with the longitudinal axis of the fingers; to form a slicing device for bread from a base having an upright element hinged thereto which may be folded upon the base over the bread-locating pins in a compact relationship therewith; and, in general, to form a bread-slicing device which is simple in construction, which produces equal slices from a loaf of bread, and which is economical of manufacture.

Other objects and features of novelty of this invention will either be specifically pointed out or will become apparent when referring, for a better understanding of the invention, to the following description, taken in conjunction with the accompanying drawing, wherein:

Figure 1 is a view in elevation of a bread-slicing machine embodying features of this invention;

Fig. 2 is a plan view of the structure illustrated in Fig. 1;

Fig. 3 is a sectional view of the structure illustrated in Fig. 1, taken on the line 3—3 thereof;

Fig. 4 is a view of structure, similar to that illustrated in Fig. 3, showing a modified form thereof;

Fig. 5 is a broken plan view of the structure illustrated in Fig. 4;

Fig. 6 is a view of structure, similar to that illustrated in Fig. 4, showing a still further form which the invention may assume;

Fig. 7 is a broken plan view of the structure illustrated in Fig. 6;

Fig. 8 is a view of structure, similar to that illustrated in Fig. 2, showing a still further form which the invention may assume; and Fig. 9 is a sectional view of the structure illustrated in Fig. 8, taken on the line 9—9 thereof.

The bread-slicing device, as illustrated in Figs. 1, 2, and 3, embodies a base 11 having an elongated notch 12 along one edge in which an upright element 13 is disposed and secured by a strip 14, which is attached to the edge by suitable means herein illustrated, as by a pair of long screws 15. The depth of the notch is slightly less than the thickness of the upright element 13, so that clamping force is provided by the strip 14 for securely retaining the upright element in position. The upright element has a plurality of slots 16 of sufficient width to receive the bread knife which is accurately guided in each of the slots. The width of the fingers 19 of the element 13 is that of the slice which will be cut from the loaf, and it is to be understood that this may be varied to conform to the thickness of the slices to be cut. In other words, the bread-slicing devices may be made up with different upright elements, permitting the housewife to select the one desired, or the slicing device may be provided with a plurality of the upright elements and these may be interchanged when it is desired to change the thickness of the slices.

A plurality of pins 17 extend upwardly from the face of the base 11 in alignment with the center line of the fingers 19, so as to be out of the path of the knife which is disposed in a slot between the fingers. An aperture 18 may be provided in the base 11, by which the slicing device may be supported.

In operation, as pointed out hereinabove, the loaf of bread is placed upon the base 11, preferably with the bottom of the leaf against the upright element 13 so as to maintain the slices normal to the axis of the loaf. The loaf is maintained in position on the base element 11 by the projecting pins 17, and, to slice the loaf, it is only necessary to stroke the knife a number of times within the slots 16 to produce a plurality of like slices therefrom. If more slices are desired than the number of slots provided in the upright element 13, the bread may then be shifted forwardly upon the pins 17 in position to have further slices cut therefrom.

It will be noted from Fig. 3 that each of the gaging fingers 19 of the upright element 13 are secured together along its base portion 21 and may have a slightly tapered edge 22 by which the entire element may be wedged laterally against the ends of the notch to provide additional rigidity to that produced by the strip 14.

The upright element 13 may be fixed to the base 11 and the slots 16 cut therein after assembly. Slots 20 may be cut in the base at the same time during a single pass of the assembly through a gang of saws. The slots 20 will apprise one slicing the bread of the completion of the slicing operation.

In Figures 4 and 5, a further form of the invention is illustrated, that wherein a plurality of separate fingers 23 are utilized in forming the upright element 24 of the device. In the arrangement illustrated in the figures, offset portions 25 space the fingers 23 from each other to provide the slots 16 therebetween for receiving and guiding the bread knife. The plurality of fingers 23 are assembled in a rectangular slot 26 in a base 27 and are wedged therein both laterally and longitudinally of the slot when assembled.

In Figures 6 and 7, another form of the invention is illustrated, that wherein fingers 28 are the same dimension throughout their length and are spaced from each other a predetermined amount by the spacing elements 29 provided therebetween and retained within the notch 12 of the base by an end wedge 31 which locks the lower ends of the fingers 28 to the ends of the notch. The strip 14 provides lateral pressure to each of the fingers 28 to provide additional clamping pressure for anchoring them within the notch.

Referring to Figures 8 and 9, a bread-slicing device is illustrated wherein a base is provided with a notch 12 in which an upright element 35 is supported on a pair of hinges 36, which permit the upright element to be swung downwardly upon the top surface of the base. Slots 38 are provided in fingers 19 of the element 35 which are aligned with the pins 17 in the base. When the upright element is hinged downwardly upon the base, the pins extend within the slots 38 in the fingers 19 to protect the pins and prevent them from being bent when the slicing device is stored. When the device is disposed in raised position, as illustrated in the figure, locking elements 41 are moved toward each other to extend over the base portion of the element 35 to retain it in rigid upright position relative to the base and also to retain it in folded position. Otherwise, the bread-slicing device illustrated in Figures 8 and 9 functions in the same manner as the devices illustrated in Figures 1 to 7, inclusive.

While it is contemplated to have the device constructed entirely of wood, except for the screws, hinges, and possibly the locking elements 41, it is to be understood that it is within the purview of this invention to make the upright elements 13 of metal, each finger 19 of which would be a stamping of channel or box section to be mounted on a strap which is secured to the base 11, or with each of the stamped fingers 19 directly secured to the base by screws, or by a strip 14 as herein illustrated. While the base element may be constructed of metal, wood is preferably employed to avoid dulling the knife near the end of the slicing operations. While, in Figs. 1, 2, and 3, a device is illustrated constructed for a right-handed person, it is to be understood that the same structure is employed for changing the device to one for a left-handed person. This is accomplished by changing the pins 17 and the upright element 13 to the opposite side of the base.

The present device eliminates the difficulty experienced when employing a miter-box, of drawing the knife out of one wall of the box, and of striking the wall and interrupting the operation when the knife end fails to enter the slot on the following forward stroke. In the present construction, the bread is held in position and the stroking of the knife may be effected in both directions, with a greater amount of cutting force applied on the draw stroke. Therefore, a knife is preferably employed having saw teeth disposed to cut in the direction toward the knife handle.

What is claimed is:

1. In a bread-slicing device, a base having a notch in one edge thereof, an upright element provided with a plurality of slots disposed in said base notch, a strip secured to the edge of said base against said element for anchoring the element in said notch, and a plurality of pins extending upwardly from the surface of said base between the slots in said upright element for securing the loaf of bread in position.

2. In a bread-slicing device, a base having a notch therein, a plurality of fingers disposed in said notch, means for securing said fingers in spaced relation to each other within the notch, and a plurality of pins disposed in said base between the spaces provided by the said fingers.

3. In a bread-slicing device, a base having a notch therein, a plurality of fingers disposed in said notch, means for securing said fingers in spaced relation to each other within the notch, a plurality of pins disposed in said base between the spaces provided by the said fingers, and strip of material drawn against the edge of said base for clamping said fingers in position therein.

4. In a bread-slicing device, a base, an upright element embodying a plurality of spaced fingers, hinged means for supporting said upright element on the base in position to be moved forwardly against the surface thereof, pins in said base aligned with said fingers for locating the loaf of bread thereon, said fingers having slots for receiving said pins when the upright element is disposed against the surface of the base.

EDWARD L. WOOD.